Aug. 16, 1932.  C. E. MAYNARD  1,872,158
APPARATUS FOR VULCANIZING ANNULAR ARTICLES
Filed Oct. 24, 1927  5 Sheets-Sheet 1
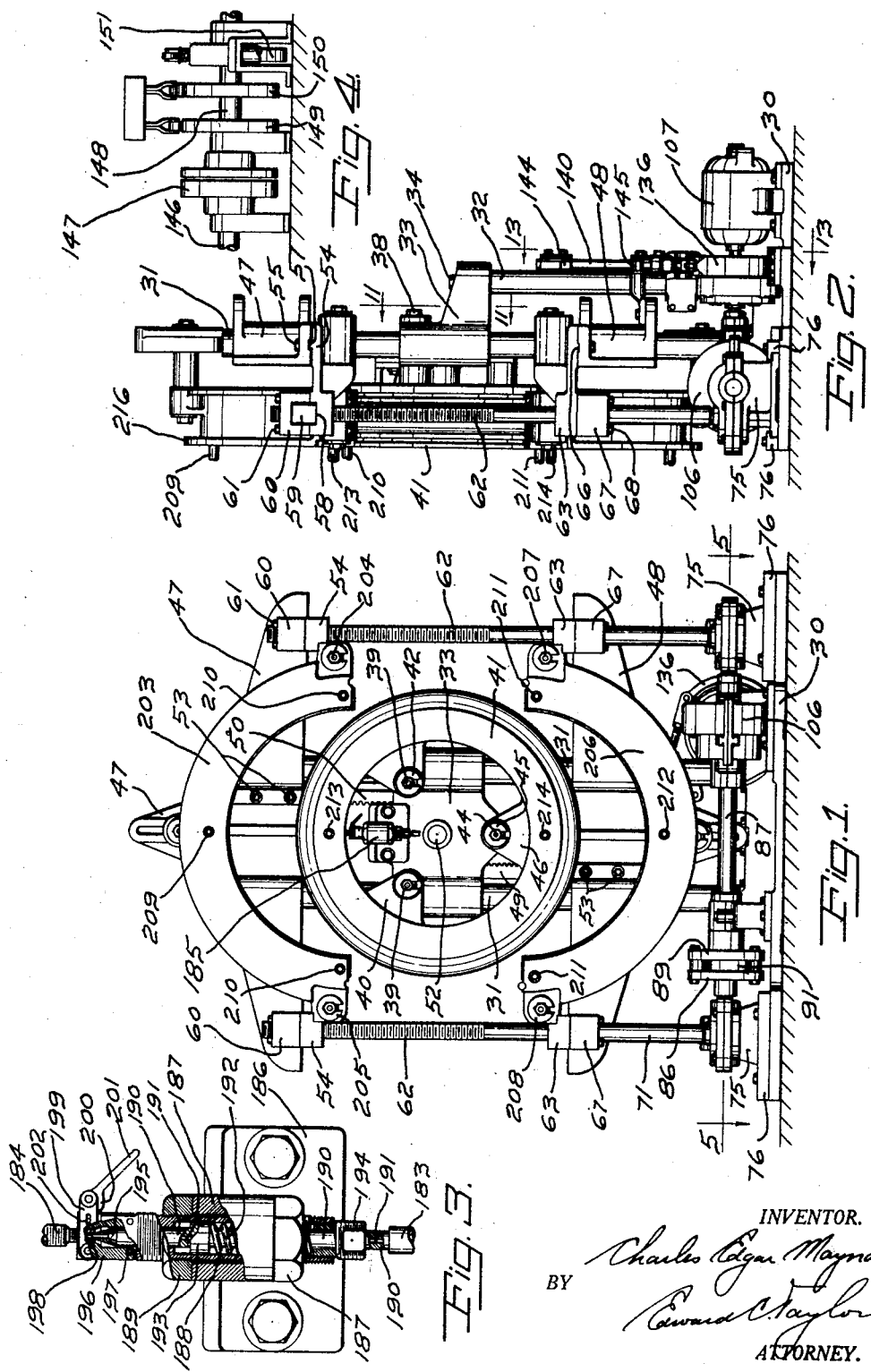
INVENTOR.
Charles Edgar Maynard
BY
Edward C. Taylor
ATTORNEY.

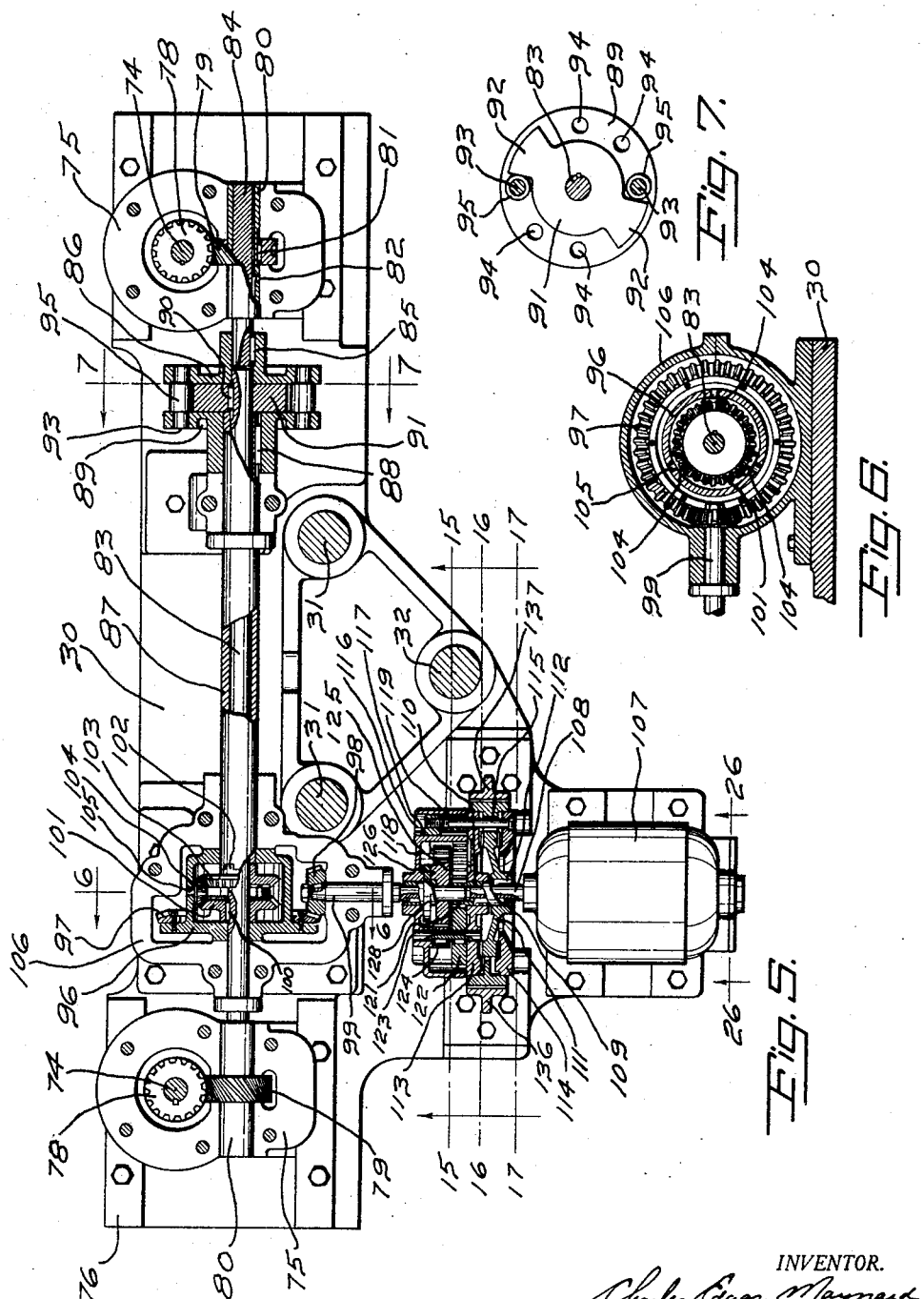

Aug. 16, 1932.     C. E. MAYNARD     1,872,158
APPARATUS FOR VULCANIZING ANNULAR ARTICLES
Filed Oct. 24, 1927     5 Sheets-Sheet 3
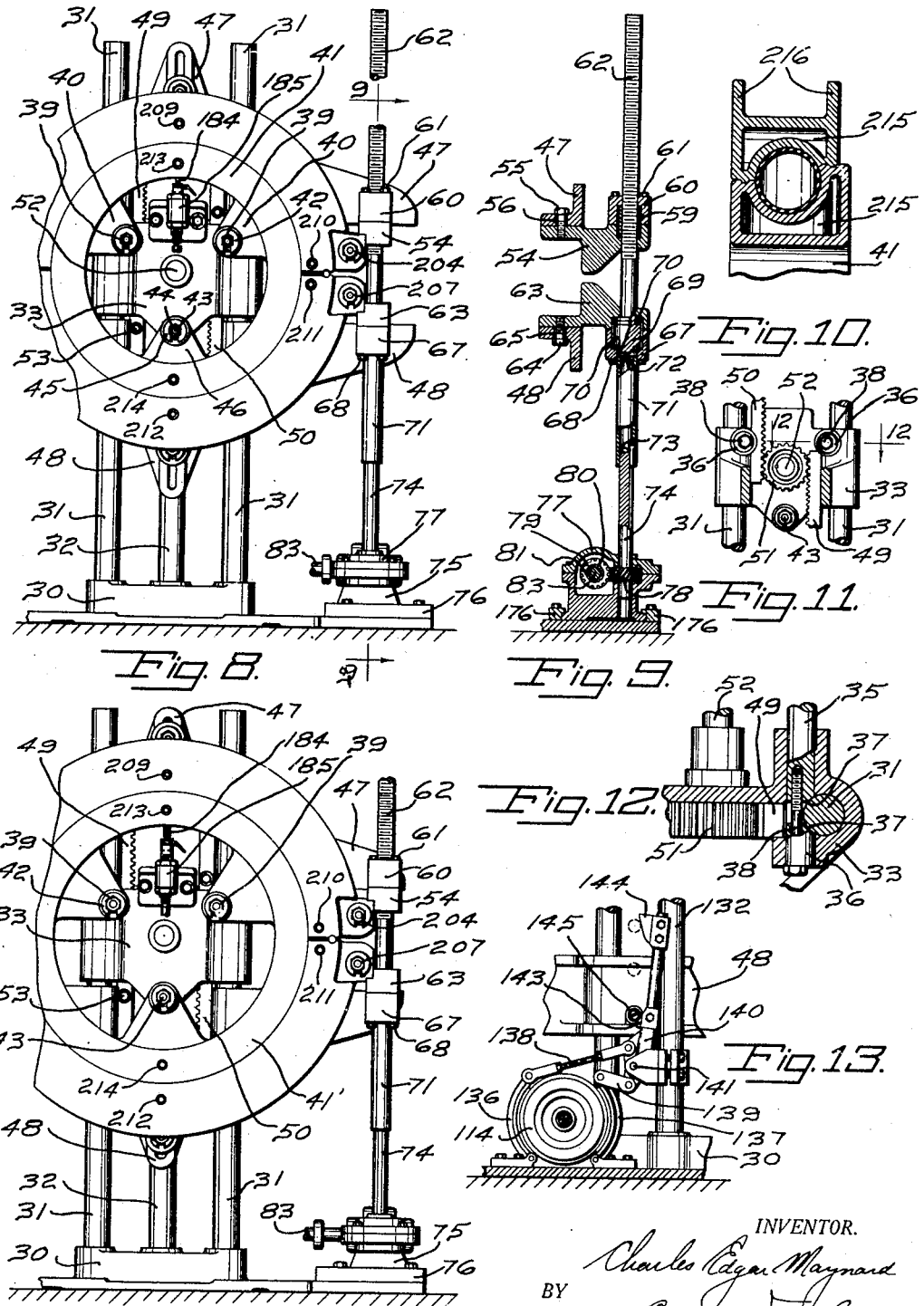
INVENTOR.
Charles Edgar Maynard
BY
Edward C. Taylor
ATTORNEY.

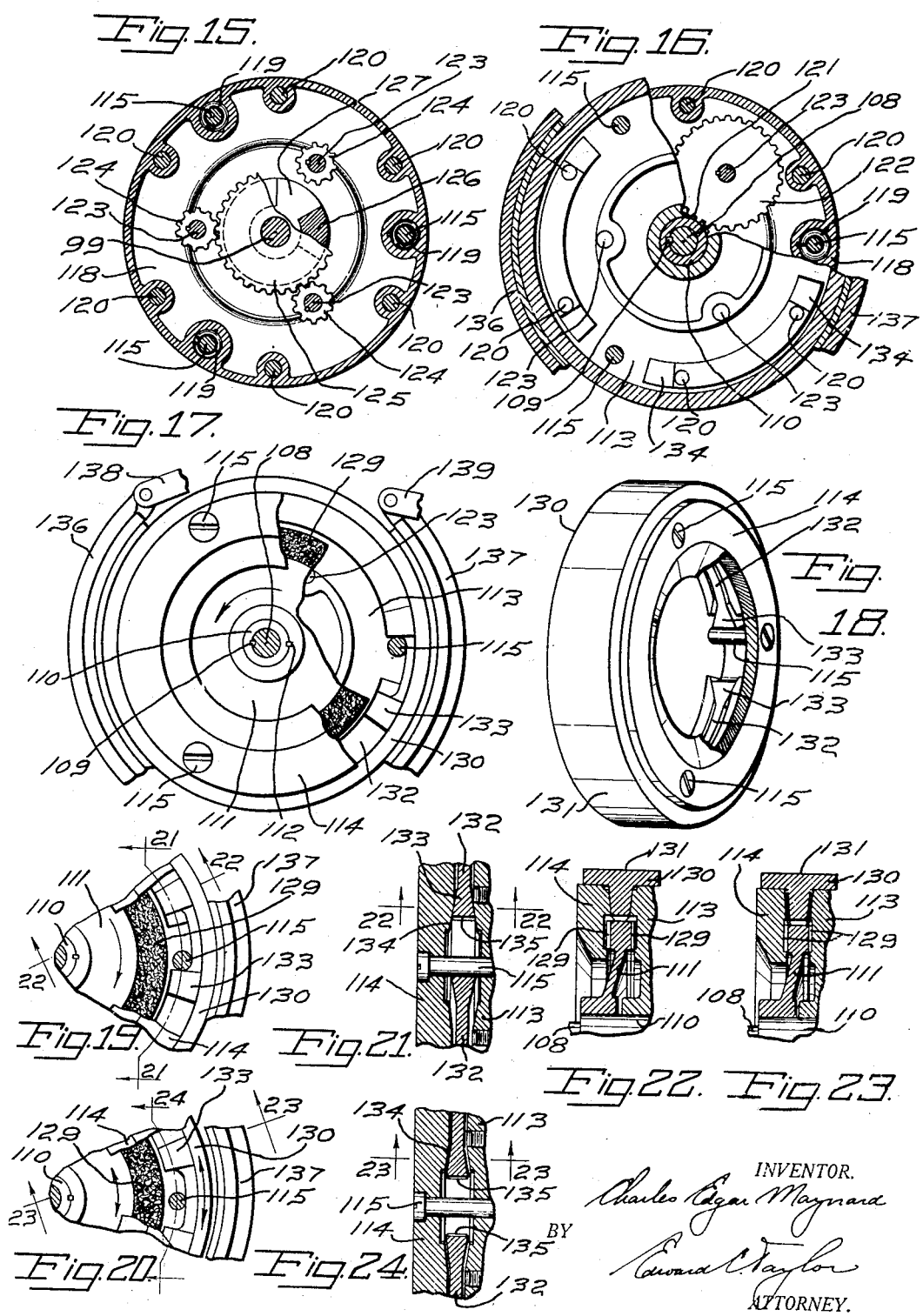

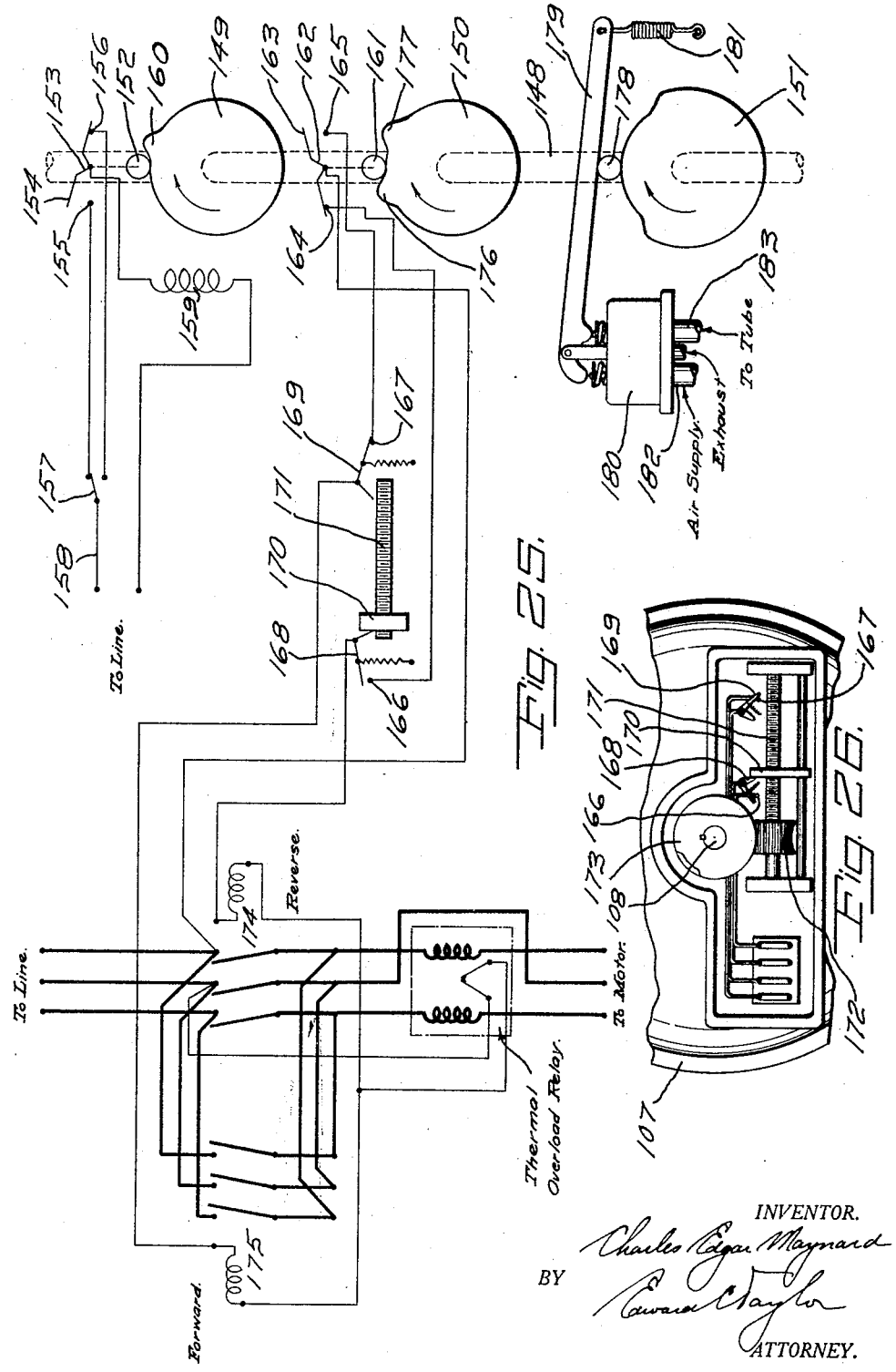

Patented Aug. 16, 1932

1,872,158

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

APPARATUS FOR VULCANIZING ANNULAR ARTICLES

Application filed October 24, 1927. Serial No. 228,175.

This invention relates to apparatus for vulcanizing annular articles such as inner tubes for pneumatic tire casings. One object of the invention is to provide an individual vulcanizer in which the mold opening and closing is accomplished by electrically actuated means. Another object is to control the flow of the inflating fluid to the interior of the tube by means operating automatically in timed relation to the mold opening and closing devices. Another object is to increase the power applied to the mold sections as the latter approach and leave their extreme open and closed positions, and to decrease the speed of movement of the mold sections at the same time. Looking at this feature of the invention somewhat differently, my improved vulcanizing apparatus gives to the mold sections an increased speed while moving freely, but seats them slowly but powerfully together, avoiding shocks at the ends of their movement. Another object is to lock the mold sections together as they reach their closed position. Another object is to so mount the mold sections that they will counterbalance each other. Another object is to equalize the closing force applied to the opposite ends of the sections. Other and further objects will appear from the description and claims.

This invention is an improvement on that described in my prior application Serial No. 210,295, filed August 3, 1927, for apparatus for vulcanizing annular articles.

Referring to the drawings,

Fig. 1 is a front elevation of my improved vulcanizing apparatus, showing the mold open;

Fig. 2 is a side elevation thereof;

Fig. 3 is a detail of the connection for the valve stem of the tube to be vulcanized;

Fig. 4 is a detail of certain cams used in controlling the timing;

Fig. 5 is a section on line 5—5 of Fig. 1;

Fig. 6 is a section on line 6—6 of Fig. 5;

Fig. 7 is a section on line 7—7 of Fig. 5;

Fig. 8 is a front elevation of the apparatus, showing the mold closed;

Fig. 9 is a section on line 9—9 of Fig. 8;

Fig. 10 is a section through the assembled mold;

Fig. 11 is a section on line 11—11 of Fig. 2;

Fig. 12 is a section on line 12—12 of Fig. 11;

Fig. 13 is a section on line 13—13 of Fig. 2;

Fig. 14 is a view similar to Fig. 8, but showing the use of a mold of differing size;

Fig. 15 is a section on line 15—15 of Fig. 5;

Fig. 16 is a section on line 16—16 of Fig. 5;

Fig. 17 is a section on line 17—17 of Fig. 5;

Fig. 18 is a perspective view of a clutch;

Fig. 19 is a detail, partly broken away, of the clutch shown in Fig. 18;

Fig. 20 is a similar view with the parts in a different position of operation;

Fig. 21 is a section on line 21—21 of Fig. 19;

Fig. 22 is a section on line 22—22 of Figs. 19 and 21;

Fig. 23 is a section on line 23—23 of Figs. 20 and 24;

Fig. 24 is a section on line 24—24 of Fig. 20;

Fig. 25 is a diagrammatic view of the control system; and

Fig. 26 is a section, on an enlarged scale, on line 26—26 of Fig. 5.

The vulcanizing mold and its operating parts are carried upon a base 30, the mold sections being supported in elevated position above the base by two upright posts 31 and a shorter upright post 32. A fixed head 33 is fastened to the three posts, being secured to a reduced and screw-threaded end of post 32 by a nut 34 shown in Fig. 2. As appears best in Fig. 12, the fixed head 33 is held to posts 31 by pairs of rods 35 and 36 rounded as at 37 to embrace the post partially, and drawn together by a clamp screw 38. The front ends of rods 35 are reduced and screw-threaded to receive nuts 39 by which lugs 40 of the central mold section 41 are held in place. The holes in the lugs through which the reduced ends of rods 35 extend are made large enough to pass the nuts 39 as well, so that the mold section is easily removable; the nuts 39 bearing, when the mold is assembled on the head, against slotted washers fitted over the rods. The lower side of the mold is similarly held upon a rod 43 secured to the fixed head and carrying a nut 44 and a slotted washer 45 bearing against a lug 46 on the mold. To remove the mold section, as for replacement with one of a different size, it is necessary merely to loosen the nuts sufficiently to release the slotted washers which are then removed, leaving the mold free to be drawn forwardly over the rods and nuts.

Mounted for vertical reciprocation on posts 31 and 32 are an upper sliding head 47 and a lower sliding head 48, carrying the semi-circular outer mold sections in a manner which will be described below. The lower head carries a rack 49 and the upper head a rack 50, each meshing with a pinion 51 (Fig. 11) journaled upon a shaft 52. The racks are guided, as shown in Fig. 12, in ways cut in the fixed head 33 and are attached to the heads by bolts 53; and the shaft 52 is likewise supported by the fixed head. By the described interconnection of the upper and lower heads they, as well as the mold sections carried by them, are caused to approach and recede from each other at equal speeds but in opposite directions, and to be equally spaced from the central mold section at all times. No power is transmitted through this rack and pinion gearing, which serves only to cause equal and opposite motions of the upper and lower heads and to counterbalance the weight of each head and mold section by the weight of the other.

Power for closing or opening the molds is applied to the uper head through brackets 54, best shown in Figs. 2 and 9, which are attached to the head by screws 55 passing through slots 56 in sidewardly extending portions of the head. A rib 57 formed on each bracket (Fig. 2) fits into the slot and preserves the alignment of the bracket and head in all positions of adjustment of the former. This adjustment is used to permit the replacement of the mold sections with others of different size, while maintaining the point of application of the mold closing and sealing pressure as near the outer edge of the mold as possible. The brackets 54 are each channeled as at 58 (Fig. 2) to receive a rectangular nut 59 (Figs. 2 and 9). The nut is held in place by a cap 60 screwed at 61 to the bracket, and is of slightly less size than the channel so as to permit self-adjustment sufficient to prevent binding. Threaded through the nuts are screw-threaded rods 62 which have simple rotative connection with the lower head so that when they are rotated the upper and lower heads are moved towards or away from each other.

The arrangement of the lower head is in general similar to that described for the upper one. Brackets 63 are attached by screws 64 passing through slots 65 in the head and bear aligning ribs 66. A cap 67 is attached to each of the brackets by screws 68. Instead of a nut, however, each cap encloses a cylindrical enlargement 69 of one of the rods 62, held in place between thrust washers 70 so that the rod can be rotated freely but held against longitudinal movement. Power being applied to the rods, the heads are drawn together or pushed apart, their concentric relation with the fixed head being maintained by the rack and pinion gearing.

To accommodate slight inaccuracies in the mounting of the mold parts the rods 62 are driven simultaneously through a differential gearing which permits one or the other to travel a slight amount after the other has stopped and insures that both sides of the mold will be closed with the same degree of pressure. If left to itself, however, this differential mechanism might cause trouble due to one rod having more resistance to rotation than the other, causing the rods to turn at different speeds and the heads to become cramped. I have therefore provided a lost motion connection which, while it permits all action of the differential necessary for the function of insuring even seating of the mold sections, locks the rods positively together for all motion in excess of this.

Each of the rods 62 is secured at its lower end to a sleeve 71, as by a pin 72 (Fig. 9). The sleeve is slidingly keyed at 73 to a shaft 74 journaled at its lower end in a housing 75. To accommodate different sizes of molds the housing 75 is arranged to be located at different distances from the center line of the apparatus, and for this purpose it is mounted in ways 76 formed in the base 30. A spiral gear 78 keyed to the shaft 74 meshes with a similar gear 79 joined to a sleeve 80 (Fig. 5) by a key 81. This sleeve remains in the same position relative to housing 75 in all positions of adjustment of the latter, the two sleeves receiving rotative movement by being slidingly keyed at 82 to shafts 83 and 84, respectively, extending transversely of the machine in axial alignment.

Shaft 84 is keyed as at 85 to a disk 86 shown best in Fig. 5. Shaft 83 passes loosely through a sleeve 87 keyed at 88 to a similar disk 89 appearing both in Figs. 5 and 7, and is itself keyed at 90 to a stop member 91 having radial projections 92. The disks 86 and 89 are joined by pins 93 mounted in holes 94 and carrying rollers 95 for contact with the sides of the stop projections 92. The sleeve 87, the disks 86 and 89, and the short shaft 84 form one functionally integral group; while the shaft 83 and the member 91, acting as another functionally integral group, are free to rotate in either direction relative to the first group until the rolls 95 contact with the sides of projections 92. When this occurs the two groups themselves move as one, and the differential action of the mechanism about to be described is inhibited.

Shaft 83 passes freely through a differential housing 96 carrying on its periphery a bevel gear 97. This gear meshes with a bevel pinion 98 keyed upon a stub shaft 99 to which power is supplied by a motor and a change-speed mechanism which will be considered presently. The shaft 83 is keyed at 100 to a bevel gear 101 and the sleeve 87 joined by a clutch-like coupling 102 to an opposed bevel gear 103. Meshing with both of these gears are bevel pinions 104 carried upon stub shafts 105 mounted in the differential housing 96. This mechanism, which may be housed in a casing 106, is constructed and operates similarly to all differential gearing, and its action need not be considered in detail except to say that it serves to distribute the power from shaft 99 to the two shafts 74 in proportion to the force necessary to close the two sides of the mold. During the major portion of the mold opening or closing movement of the parts, however, the differential action is prevented by the lost motion device described above.

Power is supplied to the shaft 99 by a motor 107 acting through a two-speed device which operates to decrease the speed of the mold sections, and increase the power with which they are moved, as the sections near the limit of their motion in either direction; and through a lost-motion mechanism serving simply to put the mold sections into motion with a slight jar or shock which breaks any adhesion between them. The shaft 108 of the motor is joined by a key 109 to a sleeve 110 which surrounds it, the sleeve itself being keyed to a clutch disk 111 at 112. A disk 113 is freely rotatable upon the sleeve, as is a similar disk 114 connected to disk 113 by rods 115. Each of these rods has a head 116 running in a cylindrical bore 117 formed in a casing 118, and is surrounded by a spring 119 compressed between the head and the bottom of the bore. By this arrangement the disks 113 and 114 are constrained for simultaneous rotation and are yieldingly pressed together by springs 119. Bolts 120 keep the casing 118 in tight engagement with the disk 113.

The end of sleeve 110 remote from the motor is formed as a pinion 121, meshing with which are three gears 122 fixed upon shafts 123. These shafts also carry pinions 124 which mesh with a gear 125 loosely mounted upon the shaft 99 extending from the differential. A projection 126 is formed upon one side of gear 125 so as to strike against a similar projection 127 formed on a sleeve 128 keyed to shaft 99. The gearing described constitutes a planetary reduction train driving shaft 99 at a lower speed than that of the motor, while the projections 126 and 127 form the lost-motion device referred to.

The clutch disk 111, being keyed to the sleeve 110 which in turn is keyed to the shaft 108, rotates with the shaft, and if it is clamped between disks 113 and 114 by the action of springs 119 causes the latter disks and the casing 118 to move in unison with the shaft. In this condition the drive mechanism rotates as a unit, and shaft 99 is driven at the same speed as shaft 108. To insure ample driving friction between disk 111 and disks 113 and 114 the former is provided with a friction facing 129.

To cause the low speed drive to come into play the disks 113 and 114 are separated so that they no longer contact with disk 111, and are held against rotation so that the shafts 123, which hold gears 122 and pinions 124, are stationary. The gear train thus made active between pinion 121 and gear 125 drives the latter at a much lower rate than the former. To separate and stop the disks 113 and 114 they are encircled by an annular member 130 having an external braking surface 131 and an inwardly extending interrupted rib 132. At intervals this rib is formed into triangular cam members 133 which coact with cam surfaces 134 formed on the sides of disks 113 and 114. The faces 135 of the interrupted portion of the rib contact in certain positions with the rods 115 so that the member 130 and the disks are firmly bound together.

Brake bands 136 and 137 (Fig. 13) are positioned to surround the braking surface 131 of the annular member 130 and are joined by links 138 and 139 to a rocker 140 pivoted at 141 to the upright 32. The rocker is fitted with cam plates 143 and 144 against which a roller 145 on the lower head 48 strikes when the head is in its lowermost and uppermost positions respectively. In either of these extreme positions the rocker will be swung so as to tighten the brake bands about the annulus 130 and the low speed mechanism will therefore be brought into play as the mold sections near their limit of travel in either direction.

The action of this speed changing mechanism may be summarized briefly for clarity. When the motor 107 is in operation and the mold sections are in an intermediate stage of their travel the brake bands 136 and 137 are out of contact with the annulus 130, and the disks 113 and 114 are pressed against disks 111 by the springs 119. As previously mentioned, the whole gear mechanism rotates as a unit when in this condition. There is no relative movement between the gears and the shafts 108 and 99 rotate at the same speed. As the mold sections approach their limit of motion one of the cam plates is struck by roll 145 and the brake bands are drawn about member 130. The disks 113 and 114, being frictionally coupled to positively driven disk 111, continue to rotate relative to the annulus 130 until their cam surfaces 134 contact with the triangular cam members 133. When this occurs the disks 113 and 114 are forced apart, and cease to contact with the central disk 111. After they are free of driving contact the disks 113 and 114 are positively stopped and are thereafter held stationary by the rods 115 striking against the end surfaces 135 of the rib 132. The disks 113 and 114 now being stationary, the casing 118 and shafts 123 are likewise stationary, and power is transmitted from shaft 108 to shaft 99 through the gear train as described.

The mold is arranged with a system of controls so that after the mechanism is started to close the mold the operator need give no more attention. Shutting off the power as the mold reaches fully closed position, opening the fluid pressure line leading to the interior of the tube being vulcanized, shutting off the fluid pressure after the cure is completed, starting the power to open the mold and shutting off the power after the mold is completely opened, are all accomplished automatically in proper timed relation. The main control is derived from a control shaft 146 (Fig. 4), which may be common to a number of molds arranged side by side, and is driven continuously at a constant speed by any suitable source of power. This shaft is coupled through a magnetic clutch 147 to a shaft 148 bearing cams 149, 150, and 151.

Referring to Fig. 25, cam 149 coacts with a roll 152 joined to a two-way switch 153 of a standard type operated by a push rod so as to shift its polarity at each depression of the rod. The switch 153 carries a shifting contact member 154 completing a circuit selectively through points 155 and 156. Each of these contact points is joined by a wire to a corresponding point of a two-way switch 157 which may be of the same or of any other standard type. The contact members of the two switches 153 and 157 are connected respectively to the two sides of the control current line 158, one branch of the circuit passing through the coil 159 of the magnetic clutch 147. Electrically this circuit is the same as that used in controlling a single house light from two different points. In the position shown the circuit made through switch 157 is broken at switch 153. If now the contact member of switch 157 is shifted the circuit will be complete through member 154, point 156 and coil 159. The resulting actuation of the magnetic clutch will start shaft 148 and cam 149 in motion, a condition which continues until the projection 160 on the cam contacts with roll 152. This shifts the switch 153 and opens the circuit through coil 159, leaving it in condition, however, to be remade by a shifting of switch 157. The purpose of this much of the control is to provide for manual starting of the shaft 148 and an automatic stoppage of the shaft after completion of one complete sequence of operations, including the closing of the mold, the vulcanization of a tube, and the opening of the mold.

The cam 150 actuates, through a roll 161, a two-way switch 162 of the same type as switch 153. The contact member 163 is connected to one side of the line, and the points 164 and 165 are joined respectively to the points 166 and 167 of two limit switches, the movable elements of which are composed of two spring-pressed bell crank contact members 168 and 169. These bell cranks are positioned to be rocked alternately by a nut 170 travelling on a screw 171, driven, as shown in Fig. 26, by a worm wheel 172 meshing with a worm 173 on the motor shaft 108. The cranks are set so that they are struck by the nut at the limit of travel of the motor in either direction, and serve to stop the motor when the mold is fully opened or fully closed. Besides performing this function the mechanism just described also resets the electrical circuit so that the next succeeding actuation of switch 162 will cause the motor to be started in the reverse direction. Bell crank 169 and contact 167 are in circuit with a reversing relay 174, conventionally shown in Fig. 25, and crank 168 and contact 166 are similarly in circuit with a relay 175 serving to connect the motor for forward operation.

In order to operate switch 162 the cam 150 is provided with two projections 176 and 177 which may be fixed or adjustably mounted on the periphery of the cam. Assuming that switch 157 has been manually actuated to couple shaft 148 to shaft 146 by the magnetic clutch 147, the projection 176 comes in contact with roll 161 and causes the contact member 163 to make circuit through point 165, which, through the contact members 169 and 167, closes the circuit through the forward relay 175 and starts the motor. The motor continues to rotate until shaft 171, which is directly geared thereto, feeds nut 170 to its other end and rocks bell crank 169 breaking the control circuit and stopping the motor. Members 166 and 168 are brought into contact by the spring as soon as the nut 170 starts to move, but the circuit including these elements is held open at switch 162 until the latter is rocked by the projection 177. A sequence of operations similar to that just described then takes place, except that the motor operates in the reverse direction. The first actuation of motor 107—in the forward direction—closes the mold, while the second and reversed actuation opens the mold. The interval between these two actuations determines the time of vulcanization. This may be controlled by changing the spacing of projections 176 and 177, or by varying the speed of control shaft 146.

Cam 151 bears against a roll 178 carried by or bearing against a lever 179 which controls an air valve 180. A spring 181 holds the lever against the cam and in a position to keep the air supply line 182 closed and the tube in the vulcanizer vented through the line 183. The central mold section 41 is apertured to permit the tire valve stem 184 to pass radially through it, and a device indicated generally at 185 serves to grip the stem, admit air therethrough, and cause the tube to seat firmly against the mold at a point adjacent the valve. This device is shown in Fig. 3. Mounted upon the central head 33 is a plate 186 to which is secured a boss 187. A barrel 188 extends freely through this boss and is secured in adjusted position therein by nuts 189. A plunger 190 runs freely through the center of the barrel and has a hole 191 extending completely through it whereby the tube valve 184 is connected to the air pipe 183. A spring 192, compressed between an enlargement 193 on the plunger and a threaded sleeve 194 secured in one end of the barrel, constantly urges the plunger upwardly so that its tapered top 195, or any other suitable packing means, bears tightly against the end of the valve stem. Jaws 196 are pivoted at 197 to the upper end of the barrel and bear teeth 198 which grip the screw threads on the end of the valve stem. Clamp bars 199 are riveted to one of the jaws and carry an eccentric 200 bearing against the outer surface of the other jaw, this eccentric carrying a lever 201 by means of which it can be operated. A pin and slot connection 202 prevents the eccentric from becoming displaced beyond the position necessary for disengaging it from the jaws.

The upper mold half 203 is secured to the upper slide 47 by nuts 204 bearing upon slotted washers 205; and the lower mold half 206 similarly secured to the lower slide 48 by nuts 207 and slotted washers 208. This permits the mold sections to be removed quickly and other sections substituted in case it is desirable to change the size of tube being vulcanized. Steam connections to the upper mold half are made through an inlet 209 and two outlets 210 placed at the corners of the mold section to facilitate drainage of condensed water. Connections to the lower half are made through inlets 211 and an outlet 212. The central section, which is a complete annulus, has an inlet 213 and an outlet 214. The connections to the source of steam supply have not been shown as they will be obvious. It will, of course, be understood that each section is cored as at 215 to permit the circulation of steam. Ribs 216 are applied about the periphery of the outer mold sections to increase their rigidity when closing pressure is applied, thus making the registration of the three sections more accurate.

Having now described the construction of the mold and the manner in which its component parts operate, I will now describe the operation of the apparatus as a whole in the vulcanization of a tire. The starting position of the mold is that shown in Fig. 1. A raw tube is looped about the central mold section, and its valve stem inserted through the hole in the mold and clamped on the device 185. Sufficient air is now admitted to the tube, either by manual operation of valve 180 or by other suitable means, to distend the tube smoothly but without causing it to project between the ends of the outer mold sections when these are closed. The operator now presses switch 157, and the remainder of the operations take place automatically in properly timed succession. Closure of the switch causes the magnetic clutch to start shaft 148 in rotation, projection 176 on cam 150 then actuating the switch 163 to start motor 107. The motor, first operating through the low speed gearing until the mold parts are well in motion, through the high speed gearing during the greater part of the mold travel, and finally through the low speed gearing to effect the final closing of the mold, operates upon the upper head 47 through the action of screws 62. The lower head 48 is caused to move simultaneously but in an opposite direction by the rack and pinion connection with the upper head. Final closure of the mold is effected evenly on both ends of the section by means of the differential gearing joining the two screws 62 to the motor. As the mold sections come into closed position the motor is stopped by the swinging of limit switch arm 169 by the nut 170. Cam 151 then comes into play, admitting high pressure air to the interior of the tube by means of valve 180, and the vulcanization of the tube begins.

Control shaft 148 continues its rotation throughout the vulcanization, finally bringing cam 151 to a position in which the valve 180 is reversed, the air supply being shut off and the interior of the tube vented to the atmosphere. After a time interval sufficient to reduce the pressure in the tube below a point at which the tube would "balloon" if unsupported, projection 177 on cam 150 operates switch 163 and restarts the motor 107. A sequence similar to that occurring in the closing of the mold takes place, except that the motor operates in the reverse direction, stopping ultimately with the mold parts in the position of Fig. 1 in which the tube may be removed. The magnetic clutch is finally disengaged by the action of cam projection 160, and the mechanism is ready for the vulcanization of another tube.

Having thus described my invention, I claim:

1. A mold for annular articles comprising a central circular section, a plurality of outer sections, power means acting upon the ends of the outer sections for moving the outer sections away from or toward the central section, and differential gearing interposed between the two ends of the outer sections for equalizing the closing force of the molds.

2. A mold for annular articles comprising a central circular section, a pair of semicircular outer sections, means acting on the ends of the outer sections for moving them towards or away from the central section, a pinion fixed with respect to the central section and a pair of racks each connected to one of the outer sections and meshing with the pinion.

3. A mold for annular articles comprising a central circular section, a pair of semicircular outer sections, rotatable screws joining the ends of the outer sections, a pinion fixed with respect to the central section, and a pair of racks each connected to one of the outer sections and meshing with the pinion.

4. A mold for annular articles comprising a plurality of sections, means for closing and opening the sections, a constantly driven shaft, a control shaft, means for operably connecting the control shaft to the constantly driven shaft, a cam carried by the control shaft operable to actuate the mold closing and opening means in timed sequence, a second cam carried by said control shaft operable to admit fluid pressure to the interior of the article in the mold subsequent to the closing of the mold and to relieve said pressure prior to the opening of the mold and a third cam on said control shaft operative to disconnect the control shaft from the driven shaft subsequent to the opening of the mold.

CHARLES EDGAR MAYNARD.